(12) United States Patent
Pascault et al.

(10) Patent No.: US 6,846,564 B1
(45) Date of Patent: *Jan. 25, 2005

(54) CROSS-LINKED ACRYLIC MICROPARTICLES, METHOD FOR THE PRODUCTION THEREOF AND USE THEREOF IN COVERINGS AND MOULDING PRODUCTS

(75) Inventors: Jean-Pierre Pascault, Villeurbanne (FR); Ludovic Valette, Haguenau (FR); Philippe Barbeau, Creil (FR); Benoit Magny, Verneuil en Halatte (FR)

(73) Assignee: Cray Valley, S.A., Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/937,551
(22) PCT Filed: Mar. 24, 2000
(86) PCT No.: PCT/FR00/00740
§ 371 (c)(1), (2), (4) Date: Dec. 12, 2001
(87) PCT Pub. No.: WO00/59952
PCT Pub. Date: Oct. 12, 2000

(30) Foreign Application Priority Data

Mar. 31, 1999 (FR) ............................................ 99 04042

(51) Int. Cl.⁷ ............................ B32B 5/16; B32B 27/30
(52) U.S. Cl. ........................ 428/402; 428/327; 428/336; 428/372; 428/441; 428/451; 428/462; 428/517; 522/153; 522/154; 525/123; 525/176; 524/13; 524/176; 526/279; 526/320; 526/321; 526/322; 526/325; 526/329.5; 526/909
(58) Field of Search ............................... 428/327, 336, 428/372, 402, 441, 451, 462, 517; 522/153, 154; 524/502, 13; 525/123, 176; 526/279, 321, 322, 325, 327.5, 909

(56) References Cited

U.S. PATENT DOCUMENTS

| | | | | |
|---|---|---|---|---|
| 5,610,249 A | * | 3/1997 | Ogawa | ........................ 526/193 |
| 6,586,097 B1 | * | 7/2003 | Pascault et al. | ............. 428/402 |

FOREIGN PATENT DOCUMENTS

| | | | | |
|---|---|---|---|---|
| GB | 2178048 | | 2/1987 | ............. C08F/2/14 |
| WO | 98/28286 A2 | | 7/1998 | ......... C07D/303/00 |
| WO | 98/28286 A3 | | 8/1998 | ......... C07D/301/12 |
| WO | 98/45349 | | 10/1998 | ........... C08G/59/00 |

OTHER PUBLICATIONS

CRC Handbook of Chemistry and Physics, 2003–2004, CRC Press, Inc., pp. 2–38, 2–39.*
Chemical Abstract: XP–002123686: Nonaqueous Resin Dispersions.
Chemical Abstract: XP–002123687: Nonaqueous Emulsions of Acrylic Polymers.
Riew, C. Keith et al., *Toughened Epoxy Resins: Preformed Particles as Tougheners for Adhesives and Matrices*, American Chemical Society, 1996, pp. 33–44.
Young, Jennifer S., et al., *Effect of Comonomer Concentration and Functionality on Photopolymerization Rates, Mechanical Properties and Heterogeneity of the Polymer*, Macromol. Chem. Phys., 1998, 199, pp. 1043–1049.
Ishikura, Shinichi, *Flow and Film Properties of Coatings Containing Microgels*, Progress in Organic Coatings, 1988, 15, pp. 373–387.
3rd Nurnberg Congress, Paper 3, Key Factors for Adherence for UV Curing Coatings, International Centre for Coatings Technology.
Funke, W., et al., *Microgels—Intramolecularly Crosslinked Macromolecules with a Globular Structure*, Advances in Polymer Science, 1998, vol. 136, pp. 139–234.
Moad, Graeme, et al., *Other Initiating Systems*, Comprehensive Polymer Science, 1989, vol. 3, pp. 141–146.
Lowe, Chris, *Coil Coating Test Methods, and How Some Radiation Curable Coatings Fare*, Polymers Paint Colour Journal, Oct. 1993, vol. 183, No. 4337, pp. 464–466.

* cited by examiner

Primary Examiner—Fred Teskin
(74) Attorney, Agent, or Firm—Whyte Hirschboeck Dudek SC

(57) ABSTRACT

The invention relates to cross-linked acrylic microparticles, a method for the production thereof by polymerization in a dispersion in a non aqueous medium and to the uses thereof in covering or moulding compositions involving a favourable compromise between hardness, flexibility and adhesion. The micropparticles are obtained from a composition comprising: 50–99% mols of a constitutent (A) consisting of Cardura E 10 (meth)acrylate and optionally alkyl (meth) acrylate in $C_2$–$C_8$; a compound (B) consisting of at least one monomer or oligomer having at least 2 ethylenic unsaturations; a compound (C) consisting of at least one monomer or oligomer having in addition to one ethylenic unsaturation at least one second function (F1) with the possibility of at least partial chemical modification of the initial functions f1 into final functions f2.

31 Claims, No Drawings

CROSS-LINKED ACRYLIC MICROPARTICLES, METHOD FOR THE PRODUCTION THEREOF AND USE THEREOF IN COVERINGS AND MOULDING PRODUCTS

This invention relates to crosslinked acrylic microparticles of specific composition, to a preparation process by dispersion polymerization in non-aqueous medium in the absence of a stabilizing polymer, and to applications in coating or moulding compositions as reactive or unreactive components allowing, by virtue of its presence, improved performance qualities in terms of a compromise between hardness, flexiblity and adhesion to various substrates, without negatively affecting the other essential performance qualities of the coatings or moulding products concerned, or the implementation thereof.

These microparticles and the compositions containing them can be used in various fields of application such as: protective varnishes, paints, adhesives, inks, powders for moulding, filled or unfilled moulding products, and composites which require significantly improved performance qualities both in terms of hardness, flexibility and adhesion to various substrates.

The compromise of a common property for a material, whether this is a coating or a moulding product or a composite, is always difficult to obtain, in particular a good hardness/flexibility/adhesion compromise.

One known method for improving the hardness/flexibility compromise is to incorporate into a hard matrix a softer additive, or vice versa. For example, fragile matrices of epoxy/amine type can be reinforced by adding thermoplastics or elastomeric particles of core-shell type as described in "Toughened Plastics" Adv. Chem. Series, No. 252 (1996) Ed. C. K. Riew and A. J. Kinlock, Am. Chem. Soc., Washington D.C. The major drawback of this solution is a very considerable increase in the viscosity of the formulations, which poses problems of moulding or of use as a coating.

In the case of coatings, in order to increase the hardness, it is common practice to incorporate multifunctional crosslinking agents into the formulation in order to increase the crosslinking density of the film. The addition of these agents entails an increase in the internal constraints and the heterogeneity of the matrix (Macromol. Chem. Phys., 1998, 1043–1049) and, consequently, a decrease in the flexibility and adhesion of the coating. The use of microparticles in coatings is already known in Prog. Org. Coat., 15, 1988, 373 for improving the mechanical properties of the coating. However, the increase in the breaking stress is achieved at the expense of the flexibility of the material. Moreover, no effect on the adhesion is described.

Specifically, the adhesion is also a key property for coatings and for moulding compositions reinforced with fillers. A general description of the phenomenon of adhesion is given in the Handbook of Adhesion (D. E. Packham, Longman Scientific & Technical, 1992). The adhesion depends, on the one hand, on the interactions between the substrate and the molecules in the coating, and, on the other hand, on the mechanical properties of the coating. Generally, in a homologous series of chemical composition, a harder coating will result in poorer adhesion. Examples of the change of the adhesive properties as a function of the viscoelastic properties in the field of photo-crosslinkable coatings are given in the publication of the Proceedings of 3rd Nurnberg Congress, European Coatings Show, paper No. 3, March 1995.

The main drawback of the systems described in the literature is that it is not possible to simultaneously increase two properties such as the flexibility and the hardness. Moreover, the adhesion of the system generally decreases when the hardness of the material increases.

The present invention overcomes the limitations and drawbacks of the prior art and makes it possible to increase the hardness of materials, such as coatings or moulding products or composites, by the addition of specific crosslinked microparticles, while at the same time conserving, or possibly improving, the level of flexibility of the material and at the same time improving the adhesion of the material to a substrate, and more particularly to difficult substrates, such as polyolefins and more particularly polyethylene or polypropylene and ethylene/propylene copolymers. Another advantage of the microparticles of the invention is their excellent compatibility, thus allowing an incorporation to high levels, with no problems of compatibility and with no negative effect on the rheology of the compositions concerned or on the application conditions, either for coating compositions or for moulding compositions.

More particularly, the present invention makes it possible to obtain coatings with improved hardness and flexibility and with very good adhesion to polar or non-polar substrates, and more particularly coatings as a thin layer of less than 100 $\mu$m and preferably less than 50 $\mu$m on substrates with difficult adhesion such as polyolefins in general and, more particularly, polyethylene and polypropylene, without a surface treatment. Specifically, this is made possible by virtue of the presence in these compositions of novel crosslinked acrylic microparticles, of essential specific composition and structure and of between 10 and 300 nm in size, which can be adapted to each application.

A first subject of the invention relates to crosslinked microparticles of between 10 and 300 nm in size, obtained by polymerization of a composition of ethylenically unsaturated polymerizable compounds, characterized in that the composition of the polymerizable compounds comprises:
- a first component A representing from 50 to 99 mol % of the said composition and consisting of isobornyl (meth) acrylate and/or norbornyl (meth)acrylate and/or cyclohexyl (meth)acrylate and optionally in combination with a $C_2$–$C_8$ alkyl (meth)acrylate and/or Cardura E10 methacrylate
- a second component B consisting of at least one monomer or oligomer comprising at least two ethylenic unsaturations which can undergo radical-mediated polymerization
- a third component C consisting of at least one monomer or oligomer comprising, in addition to an ethylenic unsaturation which can undergo radical-mediated polymerization, at least one second reactive function f1 which is different from the ethylenic unsaturation, with the possibility of at least partial chemical modification of the initial functions f1 into final functions f2 under the condition that the functions f1 selected do not react with each other during the polymerization, and that the sum of the components A, B and C is equal to 100%. The term "(meth)acrylate" should be interpreted throughout as "acrylate and/or methacrylate".

The preferred size of these microparticles is from 10 to 200 nm and more particularly from 20 to 100 nm. They can be obtained in general by radical-mediated emulsion polymerization in aqueous medium or by dispersion polymerization in non-aqueous medium, of the said composition of polymerizable compounds. An emulsifier is present in aqueous medium, and a stabilizing polymer is present in non-aqueous medium, according to the common techniques known to those skilled in the art and described in the literature, such as in Advances in Polymer Science (1998), vol. 136, p. 139–234. The specificity of these microparticles is associated with their composition.

The component A can consist of a monomer or a mixture of monomers chosen from the (meth)acrylates of: isobornyl, norbornyl, cyclohexyl possibly in combination with a $C_2$–$C_8$ alkyl (meth)acrylate and/or Cardura E10 (meth)acrylate. The $C_2$–$C_8$ alkyl. (meth)acrylate can represent from 0 to 30 mol % of the component A. In the case of a mixture of isobornyl, norbornyl and cyclohexyl (meth)acrylates, the isobornyl (meth)acrylate preferably represents at least 50 mol % of the component A.

The preferred component A is isobornyl (meth)acrylate, with a preferred proportion in the composition of the polymerizable compounds of between 60 and 90 mol %. The $C_2$–$C_8$ alkyl (meth)acrylates are preferably chosen from the (meth)acrylates of: ethyl, propyl, n-butyl, tert-butyl and 2-ethylhexyl and/or Cardura E10 (meth)acrylate.

The component B has a function as a microparticle-crosslinking agent and comprises at least two ethylenic unsaturations per monomeric or oligomeric constituent, these unsaturations being able to undergo radical-mediated polymerization, the monomer or oligomer being other than an allylic (meth)acrylate. Preferably, the constituents of B are selected from multifunctional (meth)acrylate monomers of polymerizable ethylenic unsaturation functionality ranging from 2 to 6, substituted or unsubstituted divinylbenzenes and/or acrylic and/or methacrylic multifunctional oligomers or unsaturated polyesters of functionality ranging from 2 to 50 and with an Mn of less than 2500.

More particularly, the component B can consist of a monomer or an oligomer or a mixture of monomers or oligomers or a mixture of monomers and oligomers chosen from:
di(meth)acrylates of ethylene glycol, of propylene glycol, of butanediol, of 2-methylpropanediol, of neopentyl glycol, of hexanediol, of zinc and/or of calcium, tri (meth)acrylates of glycerol, of trimethylolpropane and/or alkoxylated derivatives, tri- or tetra(meth)acrylates of pentaerythritol and penta- or hexa(meth)acrylates of dipenta-erythtritol, oligomeric diols with an Mn of less than 2500, preferably polyethers, polyesters or polyurethanes substituted or unsubstituted divinylbenzenes acrylated acrylic or unsaturated polyester oligomers with an Mn of less than 2500, having a number of ethylenic unsaturations per mole of from 2 to 50 and preferably from 2 to 20 with the proportions of the component B in the composition of the polymerizable compounds preferably ranging from 0.5 to 10 mol %.

The component C is an agent for functionalizing the microparticles of the invention. The functions f1 borne by the component C may be identical or different depending on whether or not the component C comprises one or more monomers and/or oligomers of identical or different functions f1, with the condition that, when the functions f1 are different, they do not react with each other during the polymerization. The functions f1 are preferably selected from the following functions: epoxy, hydroxyl, carboxyl, carboxylic anhydride, isocyanate, silane, amine or oxazoline.

The component C is preferably present in a molar content of from 0 to 49.5% relative to the composition of the polymerizable compounds A, B and C and consists of at least one monomer and/or oligomer selected from:

(meth)acrylic acid, maleic, fumaric or itaconic acid, when f1 is a carboxyl function maleic anhydride or itaconic anhydride, when f1 is a carboxylic anhydride function hydroxyalkyl (meth)acrylates containing a $C_2$–$C_6$ alkyl or mono(meth)acrylates of polyether- or polyester- or polyurethanediol or polycaprolactone oligomers with an Mn of less than 1500, when f1 is a hydroxyl function glycidyl (meth)acrylate, (meth)acrylates of epoxidized derivatives of dicyclopentadiene or epoxidized vinylnorbornene (meth)acrylates or alkoxylated glycidyl ether (meth)acrylates or (meth)acrylates of epoxidized derivatives of cyclohexene, when f1 is an epoxy function isocyanatoethyl (meth)acrylate and urethane mono(meth)acrylates derived from diisocyanates, when f1 is an isocyanate function (meth)acrylates bearing a trialkyl- or trialkoxy-silane group, when f1 is a silane function dimethylaminoethyl (meth)acrylate or tert-butylaminoethyl (meth)acrylate, when f1 is an amine function 2-(5-(meth)acryloylpentyl)-1,3-oxazoline, when f1 is a oxazoline function.

More particularly, the component C is present in a molar content of from 5 to 30% relative to the sum of the polymerizable compounds A, B and C and it is selected from: glycidyl (meth)acrylate, $C_2$–$C_6$ hydroxyalkyl (meth)acrylates, (meth)acrylic acid, maleic acid or anhydride, itaconic acid or anhydride, isocyanatoethyl (meth)acrylate, dimethylaminoethyl (meth)acrylate.

The functions f1 borne by the component C can be at least partially chemically modified to lead to the presence of modified functions f2 obtained from the functions f1, the functions f2 preferably being chosen from: (meth)acrylates, vinyls, maleates, fumarates, itaconates, allylic alcohol esters, unsaturations based on dicyclopentadiene, $C_{12}$–$C_{22}$ unsaturated fatty esters or amides, carboxylic acid salts or quaternary ammonium salts.

The chemical modifications of the functions f1 into functions f2 can be carried out according to the methods already known in the literature. For example, the functions f2:

(meth)acrylates from the functions f1:
epoxy, by reaction with (meth)acrylic acid
carboxyl or anhydride, by reaction with glycidyl (meth)acrylate or hydroxyalkyl (meth)acrylate containing a $C_2$–$C_6$ hydroxyalkyl maleates or itaconates, from epoxy or hydroxy functions f1 by reaction with maleic or itaconic anhydride carboxylic acid salts, from carboxyl functions f1 by neutralization with a base such as sodium hydroxide, potassium hydroxide, aqueous ammonia or an amine quaternary ammonium salts, from tertiary amine functions f1 by reaction with an inorganic or organic acid allylic alcohol esters, from anhydride functions f1 by reaction with an allylic alcohol dicyclopentadiene (DCPD) unsaturation, from carboxyl functions f1 by addition reaction of DCPD vinyl, from hydroxyl functions f1 by reaction with a vinyl azlactone such as 2-vinyl-4,4-dimethylazlactone or a vinyl isocyanate such as isopropenyldimethylbenzyl isocyanate unsaturated $C_{12}$–$C_{22}$ esters or amides, from carboxyl or anhydride functions f1 by reaction of an unsaturated $C_{12}$–$C_{22}$ fatty alcohol or amine.

One specific preferred composition of the microparticles of the invention comprises:

50 to 95 mol % of a component A consisting of isobornyl and/or norbonyl (meth)acrylate 0.5 to 10 mol % of a component B as defined above 0 to 49.5 mol % of a component C as defined above with the additional condition that the sum A+B+C=100 mol %.

Among the preferred microparticles bearing functions f1 at the start, mention may be made of:

microparticles bearing carboxyl functions f1 or carboxyl functions f1 which have been partially or totally modified into (meth)acrylate and/or maleate and/or fumarate and/or maleimide and/or carboxylic acid salt functions f2 microparticles bearing epoxy and/or hydroxyl functions f1 or epoxy and/or hydroxyl functions f1 which have been partially modified into (meth)acrylate and/or maleate and/or fumarate and/or maleimide functions f2.

The (meth)acrylic and/or maleate and/or fumarate functions are advantageous in compositions which can undergo radical-mediated crosslinking: either via UV radiation or treatment with a beam of electrons, or via a radical-mediated thermal initiator system such as a system comprising a peroxide derivative, optionally in the presence of a decomposition accelerator.

The epoxy and/or hydroxyl functions can participate in compositions which can undergo photochemical crosslinking in the presence of a cationic photo-initiator or via condensation. The carboxyl functions are especially advantageous in condensation reactions.

The carboxylic acid salts or quaternary ammonium salts are advantageous in aqueous compositions on account of their water-dispersible or water-soluble functions, which makes the microparticles concerned water-dispersible or water-soluble in a water-based application composition.

The double functionality f1/f2 such as carboxyl/(meth)acrylate or epoxy/(meth)acrylate and/or maleate and/or fumarate allows the use of microparticles concerned in dual reactive systems with a double mechanism of crosslinking per function f1 or f2. Consequently, the functions f1/f2 of these crosslinked acrylic microparticles can be adapted as a function of the application and of the host composition.

A second subject of this invention is a specific process for preparing microparticles of the invention, which has the advantage of being simpler and more practical than those already known in the prior art.

This process for preparing microparticles of the invention comprises a step of radical-mediated dispersion polymerization, in non-aqueous medium which is non-solvent for the polymer formed, of a composition of polymerizable compounds A, B and C, as defined for the microparticles of the invention, without the need to add a stabilizing polymer for the microparticles formed, either before, during or after polymerization, it being possible for the said process to comprise, where appropriate, an additional step of at least partial chemical modification of the functions f1 borne by the component C as defined in the invention.

This preparation method thus avoids the drawbacks associated with the presence of a stabilizing polymer:

problem of availability of the stabilizing polymer and of solubility in the polymerization medium negative effect on the performance qualities of the microparticles in terms of compatibility or of reactivity of the reactive functions.

The particular feature of this process is associated with the specific composition of the composition of polymerizable compounds and more particularly with the nature of the component A of the invention as defined above.

Among the specific advantages of the microparticles obtained by this specific process, mention may be made of a compatibility and, depending on the case, a reactivity which are markedly improved without any limitation in terms of availability or of characteristics of the stabilizing polymer.

Moreover, their particular structure, obtained by means of the specific process used, gives the microparticles obtained a self-dispersibility and self-stabilizing nature in a solvent medium which is identical or comparable to that for the polymerization. Similarly, this process allows the production of crosslinked microparticles which are highly monodisperse in terms of size, which is important for achieving specific rheological and viscoelastic performance qualities in certain applications in the field of coating compositions, moulding compositions or composites.

The solvent used for this process is an organic solvent or a mixture of organic solvents selected from $C_6$–$C_{10}$ alkanes such as hexanes, heptanes and more particularly n-heptane, cyclohexane, octanes, nonanes and/or $C_3$–$C_5$ alkanols such as isopropanol, butanol or pentanol. Mixtures of non-polar solvents such as heptane with polar solvents such as isopropanol are preferred to adjust the solvating power of the medium relative to the polymerizable compounds, on the one hand, and the non-solvating power of the medium, which becomes a precipitation medium, relative to the polymer formed, on the other hand. The weight ratio between $C_6$–$C_{10}$ alkane and $C_3$–$C_5$ alkanol can range from 0/100 to 75/25 and more particularly from 25/75 to 50/50. This remains preferred in particular when this mixture is based on n-heptane or cyclohexane, on the one hand, and on isopropanol or butanol, on the other hand.

The weight ratio between the sum of the component A, B and C, on the one hand, and the solvent or mixture of solvents, on the other hand, can range from 10/90 to 50/50 and preferably from 15/85 to 30/70. This ratio is one of the parameters of the process for controlling the size of the microparticles. The more the dilution increases, the greater the tendency of the size of the microparticles to decrease.

The dispersion polymerization of the ethylenically unsaturated compounds is carried out via a radical route by adding a radical initiator commonly used for this type of polymerization, which is suited to the medium. The polymerization temperature is adapted to the decomposition temperature of the radical initiator chosen and to the boiling point of the solvent medium used and may vary in general, as a function of the initiator and the solvent medium used, from 20° C. to 150° C. As examples of initiators, mention may be made of: azo derivatives such as azobisisobutyronitrile (AIBN) and derivatives, peroxides and hydroperoxides or any other initiator system which is soluble in the polymerization medium and known to those skilled in the art. More particularly, these initiators can be functionalized with a reactive function f3 such as hydroxyl or carboxyl, such as, for example, hydroxylated or carboxylated azo derivatives. In this case, the microparticles obtained will be at least partially functionalized with the functions f3. Moreover, other radical initiators can be used for a so-called "controlled" or "live" radical-mediated polymerization, as described in Comprehensive Polymer Science, vol. 3, pp.

141–146, Pergamon, London, 1989. Similarly, chain-transfer agents such as mercaptans can be combined with the initiator in order better to control the molecular masses. The polymerization time will depend on the nature and content of initiator and on the polymerization temperature. The usual initiator content can range from 0.05 to 5% by weight relative to the sum of the polymerizable components A, B and C.

According to a first embodiment of this batch process, all of the polymerizable components A, B and C are added, with stirring, from the start in the reactor containing all of the solvent and maintained at the polymerization temperature. The monomers can also be added in solution form in some of the polymerization solvent. The initiation of the polymerization takes place, with vigorous stirring, by gradual addition of the radical initiator chosen, which is soluble in the polymerization medium. After the end of the addition of the initiator, the polymerization proceeds for a time which can range from 1 h to 8 h depending on the temperature, the nature and content of the initiator, and the nature and overall concentration of polymerizable compounds. The self-stabilized microparticles formed in the polymerization medium can be recovered either after successive steps of precipitation, by adding a non-solvent such as an alcohol in a proportion ranging from 2/1 to 5/1 by weight relative to the dispersion, and then of filtration and drying, or by a single step of evaporating the dispersion-medium solvent, preferably under a reduced pressure of from 10 to 30 mbar.

The final size of the microparticles obtained ranges from 10 to 300 nm and preferably between 10 and 200 nm and more particularly from 20 to 100 nm as a function of the dilution of the polymerizable compounds and the nature and molar ratio of the component A chosen. The size of the microparticles can be reduced by increasing the content of component A and/or increasing the level of dilution of the polymerizable compounds and/or increasing the precipitating power of the polymerization medium by adjusting the nature and/or composition of the polymerization-medium solvent. The essential advantage of this process and of its various embodiments is its simplicity and its flexibility in the preparation of a large variety of microparticle structures, by simply varying the nature and proportions of the components A, B and C within the previously defined limits of the invention.

According to a second embodiment of this process, it comprises one or more successive steps of continuous and/or batchwise polymerization, characterized respectively by an addition of polymerizable compounds continuously or in a single portion per step concerned, respectively. When the process comprises more than one step of batchwise and/or continuous polymerization, the composition of the polymerizable compounds may be identical or different from one step to another. Thus, it is possible to prepare very specific microparticle structures of multilayer type as a function of the composition of the polymerizable compounds in each step and as a function of the chronological order of each continuous or batchwise step.

When the composition of the polymerizable compounds comprises a component C comprising functions f1, the process as described above can comprise, after the polymerization step, an additional step of chemical modification of the function f1 and/or of the function f2 obtained from f1. This chemical modification step can take place, depending on the case, either before recovery of the microparticles by evaporating off the polymerization solvent, or after recovery of these microparticles, in which case the chemical modification can take place, depending on the case, either in bulk if the viscosity allows it at the modification temperature, or in solution in a solvent which is different from the polymerization solvent if the latter is unsuitable, as regards its boiling point or its chemical inertness. As a preferred example of a chemical modification, mention may be made of the (meth)acrylation of reactive functions such as: epoxy and hydroxyl with (meth)acrylic acid or maleic or fumaric or itaconic acid or anhydride, or carboxylic acid or anhydride with glycidyl (meth)acrylate or hydroxyethyl (meth)acrylate. For example, the (meth)acrylation can take place in solution containing about 30–60% of dispersed microparticles, in the presence of esterification catalysts such as chromium(III) diisopropyl salicylate, chromium(III) ethyl hexanoate, ethyltriphenylphosphonium bromide or tertiary amines.

One variant of this process can comprise, before the polymerization step, a step of dispersion, in the non-aqueous medium, of organic or inorganic microparticles which are insoluble in this medium, followed by a polymerization step as described above. In this case, the organic or inorganic microparticles in dispersion have sizes adapted to that of the final microparticles to be obtained. The predispersed microparticles can be chosen from organic or inorganic pigments or organic or inorganic fillers or additives or previously prepared microparticles of the invention as already described which are insoluble in the dispersion medium. This process variant allows an at least partial, but simple and practical, coating or encapsulation of the predispersed microparticles, with the aim, for example, of improving their dispersibility in other dispersion media (aqueous or organic media) or of improving their compatibility in recipient matrices for coating, moulding or composite compositions.

A third subject of the invention relates to coating or moulding or composite compositions, comprising microparticles of the invention, as defined above.

These compositions are crosslinkable or non-crosslinkable, but are preferably crosslinkable:
  either due to the presence of the microparticles of the invention bearing reactive functions f1 and/or f2 as described above
  or, independently of the presence of functions f1 and/or f2, i.e. by the reactive functions intrinsic in the initial composition without the microparticles
  or, both by the reactive functions intrinsic in the initial composition and by those of the microparticles.

Among the crosslinkable compositions, it is also possible to distinguish compositions containing solely, i.e. to 100%, or essentially, i.e. between 60 and 90%, crosslinked acrylic microparticles bearing functions f1 and/or f2 which are identical or different but which react with each other to form at least one crosslinking network constituting the matrix either of a coating or of a moulding product.

For example, these compositions can consist solely or essentially of crosslinked acrylic microparticles bearing (meth)acrylate functions f2 which can undergo radical-mediated crosslinking either via a common radical-initiated thermal initiator system, containing a peroxide compound and optionally a decomposition accelerator, or via irradiation with radiation such as UV in the presence of a photoinitiator or a beam of electrons in the absence of a photoinitiator. Other examples illustrating these compounds can be cited as coating or moulding compositions consisting solely or essentially of crosslinked acrylic microparticles bearing co-reactive epoxy and anhydride functions f1, respectively.

Another example of such compositions, in particular for coatings, is an aqueous coating composition consisting solely or essentially of crosslinked acrylic microparticles of the invention, bearing functions f1 and/or f2 or comprising a specific structure which makes them water-soluble or water-dispersible and having Tg and minimum film-forming temperature characteristics which make possible their coalescence between 0 and 40° C. Such functions f1 and/or f2 may be, for example, carboxylic acid salts or ammonium salts and more particularly quaternary ammonium salts. As a specific structure of microparticles having this water-soluble or water-dispersible nature, mention may be made of the presence of acrylated oligomers based on polyethers such as polyethylene glycol, preferably with a number-average molecular mass of less than 2500 and preferably less than 1500.

In the case of coating or moulding or composite compositions in which the crosslinked acrylic microparticles of the invention are partial components which are reactive or unreactive in the presence of other reactive or unreactive components of the composition, the content of these microparticles can range from 0.5 to 50% by weight relative to the sum of the organic components in this composition. Apart from the microparticles of the invention, these compositions comprise a base component which is the base organic matrix of the coating or of the moulding product and usual additives or fillers adapted or adjusted as a function of the intended application and within the capability of a person skilled in the art.

As reactive or unreactive additives, the microparticles of the invention can be used in crosslinkable or non-crosslinkable coating or moulding compositions, in general in order:

- to reduce the viscosity of these compositions, allowing better wetting and better application to the substrates to be coated and, moreover, compositions with a higher solids content and consequently a lower content of volatile organic compounds
- to better control, by specific application, the rheology of these compositions by adjusting the structure of the microparticles
- to reinforce or plasticize the matrix as a function of the compatibility and the Tg of the microparticle relative to the host matrix.

The microparticles as unreactive additives can have functions selected from f1 and f2, as defined in the invention above which, while being chemically inert with respect to the host composition, can substantially improve the compatibility of the microparticle with respect to the host matrix by means of favourable physicochemical interactions.

In the case of microparticles used as reactive additives, their reactive functions are selected and adapted or modified to react with the reactive functions of the host crosslinkable composition or with each other. For example, in the case of a composition which can undergo radical-mediated, thermal or photochemical crosslinking, containing ethylenically unsaturated monomers and/or monofunctional or multifunctional oligomers, the microparticles, after chemical modification following the polymerization step, will preferably be polyunsaturated. Polyepoxidized or polyhydroxylated reactive microparticles will be adapted for coating compositions of epoxides which can be photocrosslinked cationically in the presence of cationic photoinitiators such as triarylsulphonium or diaryliodonium salts. Polyepoxidized or polycarboxylated reactive microparticles will be adapted for the crosslinking of coating or moulding compositions based on epoxides and on polyamines or on dicarboxylic acid anhydride or carboxylated acrylic copolymers.

Similarly, partially neutralized polycarb-oxylated microparticles can serve as water-dispersible or water-soluble microparticles depending on the degree of neutralization and can be used in coating compositions based on aqueous dispersions of reactive or unreactive polymers. This water-dispersible or water-soluble nature can also be imparted by a component C and/or B having constituents selected, respectively, from the mono- and diacrylates or methacrylates of polyether diols such as polyethylene glycol with an of less than 1500. In particular water-dispersible or water-soluble microparticles bearing acrylate or methacrylate functions after partial modification of their initial functions f1 can be used in photo-crosslinkable coatings based on aqueous dispersions of polymers, preferably acrylic polymers. The microparticles used as reactive additives have a genuine reactivity-activating and crosslinking function for the system concerned, on account of their high functionality.

The effect on the mechanical performance qualities of the coating or of the moulded product is reflected by increased reinforcement and flexibility, as a function of the functionality, compatibility and Tg of the microparticle chemically grafted to the host matrix, the microparticle behaving like a grafted or ungrafted microfiller and/or a hard or flexible microfiller. The cohesion energy of the final material, the coating or moulding product, is thus increased, with a positive effect possible both on the hardness and on the flexibility.

In addition to the hardness/flexibility compromise, the presence of microparticles of the invention allows better adhesion of the compositions concerned to various polar or non-polar substrates. These substrates can be substrates coatable with coating compositions or impregnable as fillers or reinforcing agents in moulding or composite compositions.

As examples of polar substrates on which the compositions containing the microparticles of the invention give good adhesion, mention may be made of: glass, steel, aluminium, silicon, polycarbonate, wood, glass fibres, carbon fibres, polyester or polyamide fibres, and cellulose fibres.

As examples of non-polar substrates which are reputed to be difficult in terms of adhesion, and which give good adhesion performance qualities with the coating compositions and preferably with the coating compositions which can undergo radical-mediated crosslinking, mention may be made of: polyolefins, and more particularly polyethylene and polypropylene with or without a special surface treatment, and coatings with a low surface tension, such as photo-crosslinked varnishes.

Among the preferred coating compositions which have a good compromise in terms of hardness/flexibility/adhesion to polar and non-polar substrates, mention may be made of a composition which can undergo radical-mediated crosslinking containing from 0.5 to 50% by weight, preferably 5 to 30% by weight, of crosslinked acrylic microparticles of the invention as defined above, preferably bearing (meth)acrylate and/or maleate and/or maleimide reactive functions f2 and the said coating composition also comprising mono- or multifunctional acrylic or vinyl monomers and/or mono- or multifunctional acrylic oligomers or unsaturated polyester oligomers.

Mono- or multifunctional acrylic monomers which can be used are acrylic monomers of (meth)acrylic unsaturation functionality per molecule ranging from 1 to 6. More particularly, they can be selected from the following monomers and a mixture thereof: isobornyl (meth)acrylate, isodecyl (meth)acrylate, lauryl (meth)acrylate, 2-(2-ethoxyethoxy)ethyl (meth)acrylate, tetrahydrofurfuryl (meth)acrylate, 2-phenoxyethyl (meth)acrylate, tridecyl (meth)acrylate, ethoxylated nonylphenol (meth)acrylate, ethoxylated or propoxylated neopentyl glycol di(meth) acrylate, polyethylene glycol or polypropylene glycol di(meth)acrylate, hexanediol (meth)acrylate, ethoxylated and/or propoxylated trimethylolpropane tri(meth)acrylate.

When oligomers such as unsaturated polyesters are present in the composition, vinyl aromatic monomers can be used, such as styrene or vinyltoluene or allyl phthalate.

Among the mono- or multifunctional acrylic oligomers which may be present in these compositions, and preferably with acrylic monomers, mention may be made of: (meth) acrylate oligomers of functionality ranging from 1 to 50, chosen from: (meth)acrylate polyethers, (meth)acrylate polyepoxides, (meth)acrylate polyesters, (meth)acrylate polyurethanes, (meth)acrylate polycaprolactones or acrylic copolymers of at least one (meth)acrylic ester with glycidyl (meth)acrylate, which copolymers are then at least partially (meth)acrylated in a separate step. The number-average molecular mass of these oligomers or copolymers remains less than 20,000. In a more specific case of a composition, the crosslinked acrylic microparticles bearing (meth) acrylate functions f2 can completely replace the multifunctional monomer or oligomer of functionality >2 as crosslinking agent, with markedly improved performance qualities in terms of hardness/flexibility and substrate adhesion.

These compositions can undergo radical-mediated crosslinking:

either via a thermal radical-mediated route in the presence of a radical-mediated thermal initiator system comprising a peroxide derivative, such as a common organic peroxide or hydroperoxide, optionally in the presence of a decomposition accelerator such as a tertiary amine or cobalt salts such as cobalt octoate in proportions commonly used by a person skilled in the art, and in general with a content of peroxide derivative of between 0.5 and 6% and a content of decomposition accelerator of between 0.01 and 2% relative to the sum of the monomeric and/or oligomeric components, it being possible for the crosslinking also to be performed at low temperature depending on the presence or absence of a decomposition accelerator for the peroxide derivative or via a radiation route, either by UV in the presence of a photo-initiator system commonly used in acrylic photo-crosslinkable systems, such as aromatic ketones such benzophenone, α-hydroxy ketones, α-dicarbonyl derivatives, acylphosphine oxides in the presence or absence of tertiary amines, in proportions ranging from 0.5 to 10% relative to the sum of the monomers and/or oligomers in the composition, or by a beam of electrons in the absence of a photo-initiator.

More particularly, the preferred composition is a composition which can undergo radical-mediated crosslinking, which is intended to be applied or which is applied in the form of a coating to polar or non-polar substrates as defined above and which comprises:

0.5 to 50% and preferably from 5 to 30% by weight of microparticles as defined in one of claims 1 to 7, bearing (meth)acrylate and/or maleate and/or fumarate and/or maleimide and/or vinyl functions f2

50 to 95% of at least one monomer chosen from isobornyl (meth)acrylate and/or isodecyl (meth)acrylate, 2-(2-ethoxyethoxy)ethyl (meth)acrylate, tridecyl (meth) acrylate, lauryl (meth)acrylate, tetrahydrofurfuryl (meth)acrylate and 2-phenoxyethyl (meth)acrylate 0 to 5% by weight of $C_2$–$C_6$ alkylene diol di(meth) acrylate the percentages being chosen such that the total sum of the microparticles and monomers is equal to 100%.

Even more preferably, this composition can undergo radiation crosslinking, either by UV or by a beam of electrons. The preferred thickness of the coatings which can undergo radical-mediated crosslinking is less than 100 microns and more particularly less than 50 microns.

One specific case of a coating composition which can undergo radical-mediated crosslinking is a composition of an aqueous dispersion of crosslinkable polymer, comprising reactive water-dispersible or water-soluble microparticles, which participate in the crosslinking. The aqueous dispersion of crosslinkable polymer can be an acrylic emulsion which may already contain a water-soluble or water-dispersible crosslinking agent based on water-dispersible or water-soluble acrylic multifunctional monomers and/or oligomers of functionality $\geq 2$. Microparticles of the invention bearing, for example, (meth)acrylate functions f2 can partially or totally replace such a water-dispersible or water-soluble multifunctional acrylic crosslinking agent. The water-dispersibility or water-solubility of such microparticles is ensured, in such a case, by water-soluble functions f1 and/or f2 such as carboxylic acid salts or quaternary ammonium salts or by a specific water-soluble structure of a constituent of the component C of the microparticle, chosen, for example, from (meth)acrylates of polyethylene glycol or of other water-soluble or water-dispersible polyether diols. A composition of an aqueous polymer dispersion can also comprise polymers comprising reactive functions that are intrinsic to this polymer, which may participate in the crosslinking. The crosslinking of these compositions of aqueous dispersion of polymer containing the microparticles of the invention is achieved, after applying a film and film-formation of this composition on a substrate, either by a thermal radical-mediated route or by UV radiation or a beam of electrons.

Another preferred coating composition of the invention is a crosslinkable composition comprising epoxidized derivatives and microparticles of the invention, which is crosslinkable either by UV radiation in the presence of a cationic photo-initiator, or by condensation reaction with at least one second reactive component selected from: polyamines and/or carboxy-functionalized or carboxylic anhydride-functionalized polymers or copolymers.

The epoxidized derivatives are selected from epoxidized monomers, oligomers or copolymers or resins of functionality ranging from 1 to 50. More particularly, in the case of compositions which can undergo photochemical crosslinking in the presence of a cationic photo-initiator, the epoxidized monomers or oligomers are preferably of cycloaliphatic structure. Among the cycloaliphatic epoxidized derivatives, mention may be made of: epoxidized cyclohexene, 3,4-epoxycyclohexylmethyl 3',4'-epoxycyclohexanecarb-oxylate, the cycloaliphatic epoxides described in WO 98/28286 or WO 98/45349.

When the compositions can undergo cationic photochemical crosslinking, the microparticles of the invention are preferably chosen from microparticles bearing epoxy and/or hydroxyl functions f1. The composition which can be crosslinked by condensation preferably comprises microparticles bearing epoxy and/or hydroxyl and/or carboxyl and/or anhydride and/or isocyanate and/or amine functions f1.

The coating compositions of the invention also apply to compositions comprising at least one reactive resin selected from: alkyds or unsaturated polyesters or saturated polyesters or polyamides or polyurethanes or polyureas with microparticles of the invention, preferably comprising functions f1 and/or f2 that are reactive with at least one function borne by this or these reactive resin(s).

The functions f1 and/or f2 thus allow better anchoring of the microparticles in the organic matrix with a better reinforcing and/or flexibilizing effect on the organic matrix. For example, in the case of alkyd resins, the functions f1 and/or f2 can be siccative functions such as unsaturations based on dicyclopentadiene or on allylic esters or on unsaturated fatty esters or amides.

In the case of unsaturated polyesters, the functions f2 can be (meth)acrylates and preferably maleates or fumarates. Functions f1 such as anhydride or isocyanate can be envisaged, co-reactive with OH end functions borne by the unsaturated polyester. Carboxyl functions f1 can be envisaged, for example, for maturation of unsaturated polyesters with magnesium hydroxide, according to a process of maturation with magnesium hydroxide which is well known to those skilled in the art. Similar functions f1 can be envisaged and adapted by a person skilled in the art in the case: of saturated polyesters, polyamides or polyurethanes or polyureas. These coating compositions can comprise, in addition to the reactive components, other common additives or fillers adapted to the specific need of each final application.

The invention also relates to moulding or composite compositions which may be moulding compositions comprising fillers and/or reinforcing agents. These moulding or composite compositions can comprise at least one reactive resin selected from unsaturated polyesters, dicyclopentadiene resins, vinyl esters, epoxides and polyamines or polyurethanes and polyureas or polyurethane-ureas or cyanate esters or bismaleimides, with microparticles of the invention preferably comprising functions f1 and/or f2 that are reactive with at least one function borne by this or these reactive resin(s).

The moulding compositions containing the microparticles of the invention can comprise inorganic and/or organic fillers and/or reinforcing agents chosen from: glass fibres, glass mats, carbon fibres, cellulose fibres, polyester or polyamide fibres.

One specific advantage of the microparticles of the invention is that they allow a reduction in the viscosity of the coating or moulding compositions, and consequently a significant reduction in the reactive or unreactive diluents, thereby complying more effectively with the environmental limitations. Thus, on account of their presence, these microparticles simultaneously allow: compliance with a low content of volatile organic compounds (VOC), the incorporation of higher contents of fillers or additives, and improvement of the mechanical properties of the coating or moulding or composite materials concerned. More particularly, the presence of these microparticles of functionality adapted to each application allows a good compromise in terms of hardness/flexibility and adhesion to various substrates and more particularly difficult substrates.

The field of application of these compositions is broad and comprises: protective varnishes, paints, adhesives, inks, powders for coatings, powders for moulding, moulded articles and composites.

The examples which follow illustrate the subjects of the invention without limitation.

EXAMPLES

General experimental conditions
The substrates
The photo-crosslinkable formulations are deposited on the following substrates aluminium Q-panel (panel dimensions: 0.6×76×152 mm$^3$ supplied by the company LABOMAT ESSOR), degreased with ethyl acetate glass (cleaned with acetone)

polycarbonate (LEXAN plaque from the company SCERT PLASTIQUE, 2 mm thickness)

polypropylene (reference PP301460 supplied by the company GOODFELLOW, thickness 0.5 mm)

low-density polyethylene (reference ET11452 supplied by the company GOODFELLOW, thickness 0.5 mm)

Polycarbonate, polyethylene and polypropylene are precleaned with ethanol before applying the coating.

For the need of certain characterizations (for example measurement of the adhesion), the polyolefin (polyethylene and polypropylene) substrates are treated by the Corona process before depositing the formulation (according to the conditions described in Int. Pol. Sci. Technol., No. 8, 1996, p. 630).

Photo-crosslinkable coating formulations

In the examples presented below, the coatings are obtained by radical-mediated polymerization of a photo-crosslinkable formulation under a medium-pressure UV lamp of FUSION type (electrical power: 120 W/cm) after 6 passages at 4.6 m/min. These conditions ensure maximum conversion of the acrylate double bonds in all cases.

Characterization

Measurement of the viscosity of the formulations

The viscosity of photo-crosslinkable formulations is a very important parameter for using photopolymerized films and for obtaining coatings of low thickness. In the text hereinbelow, the viscosities of the formulations are measured using a CARRI-MED CSL 100 controlled-stress cone/plate viscometer (CSL RHEOMETER) at 20° C., during a shear-rate scanning.

Measurement of the hardness of the photo-polymerized films

The hardness is measured by instrumented microindentation (FISCHERSCOPE H100 machine) at 23° C. The indenter is a Vickers-type pyramid with a peak angle of 136°. The hardness values presented hereinbelow correspond to the "universal" hardness values calculated according to the expression:

$$H_u = \frac{P}{k\delta^2}$$

in which P is the maximum load imposed, δ is the indentation depth and k is a constant dependent on the geometry of the indenter. The load P is determined such that:

i) the indentation depth is less than ⅕ of the total thickness of the film, ii) the hardness measured is substantially constant with the indented thickness.

The films are analysed systematically 24 hours after polymerization and are stored at 23° C. and at 50% relative humidity.

Measurement of the flexibility of the coatings

The flexibility of the systems on a substrate is estimated by the "T-bend" test. The test consists in rolling up the coated substrate on itself and in determining the number of turns after which the coating located on the fold is no longer damaged. The successive turns are denoted by 0 T, 0.5 T, 1 T, etc. (see description of the test in Lowe C., Rad. Cur. Vol. 183, No. 4337, p. 464). In all the cases, the thickness of the films is less than 50 µm and more generally about 20 µm.

The substrate used is an aluminium of Q-panel type described above.

The T-bend test is carried out using a manual press. Detection of the damage is itself carried out by observation using binocular magnifying glasses (magnification ×12). Good flexibility generally corresponds to a value of less than or equal to 2 T.

The films are analysed systematically 24 hours after crosslinking and stored at 23° C. and at 50% relative humidity.

Measurement of the mechanical properties of the free film at large deformations

The mechanical properties of free films at large deformations are measured in uniaxial traction at constant speed (1 mm/min) and at room temperature. The crosslinked films are cut into a dumbbell shape using a hollow punch. The test pieces thus obtained are marked with two reflective pellets 20 mm apart so as to follow the elongation during deformation using an external extensometer. The effective dimensions of the sample are typically 20×4×0.1 mm$^3$.

Measurement of the adhesive properties

The adhesion of the systems is estimated by means of the cross-cut test (ISO standard 2409) on the substrates mentioned above. A grade ranging from 0 to 5 qualifies the behaviour of the cross-cut film when it is peeled by an adhesive of known strength (the value "0" indicates that the film remained totally on the substrate; "5" indicates that the film was totally peeled off). In our case, the peel force of the adhesive used (origin: TESA) for the cross-cut test is 240±5 cN/cm (measured at 180° on a stainless steel plate). The thickness of the coatings is about 20 μm.

The films are analysed systematically 24 hours after polymerization and stored at 23° C. and at 50% relative humidity.

Measurement of the abrasion strength

The abrasion strength is measured by the TABER test according to NFT standard 30-015 (5150 ABRASER machine from TABER INDUSTRY). The test consists in measuring the loss of mass entrained by two abrasive wheels after 100 rotations.

The films are analysed systematically 24 hours after polymerization and stored at 23° C. and at 50% relative humidity.

Measurement of the chemical resistance

The resistance of the coatings to a chemical attack is evaluated by the "rub-test" which consists in measuring the time before total deterioration of the film when a continuous circular movement is applied to the surface of this film using a cloth soaked with solvent. In the cases treated below, the solvent is methyl ethyl ketone (MEK). The films are prepared on glass plates.

The thickness of the coating is kept constant and is between 40 and 50 μm in all cases.

Example 1

Synthesis of crosslinked polymer microparticles (CPMs)

131.3 g of n-heptane and 131.5 g of 2-propanol are introduced into a 500 ml reactor equipped with a condenser and a mechanical stirrer, and under a gentle flow of nitrogen. The temperature is raised to 70° C. A mixture of (meth) acrylic monomers whose composition is given below is then loaded into the reactor:

isobornyl acrylate: 69.80 g, i.e. 76 mol % (relative to the monomers)

hexanediol diacrylate: 5.02 g, i.e. 5 mol % (relative to the monomers)

glycidyl methacrylate: 11.96 g, i.e. 19 mol % (relative to the monomers).

The temperature is stabilized at 70° C. and 0.78 g of azobisisobutyronitrile (i.e. 10 mmol/l relative to the monomers) is introduced into the reactor. The reaction takes place under isothermal conditions (70° C.) for 5 h, without any significant exothermicity being noted. The dispersion remains transparent and homogeneous, of low viscosity, throughout the duration of the synthesis. At the end of the 5 h of reaction, the conversion of the monomers is greater than 95% according to the monitoring of the monomers by steric exclusion chromatography and by measuring the solids content in the solution. The CPMs formed are isolated by distilling off the synthesis solvents: the condenser is replaced with a distillation column, 87.5 g of toluene are added and the temperature is gradually raised to 105° C.

The CPMs are then acrylated by reaction with an acrylic acid, at 100° C., in the presence of a reaction catalyst, 0.8% by mass of chromium(III) diisopropyl salicylate, and 0.3% by mass of hydroquinone to avoid any radical-mediated polymerization of the acrylic functions. The chemical modification proceeds to 50% of solids, in solution in toluene, in a 250 ml reactor equipped with a condenser and a mechanical stirrer, under a gentle flow of nitrogen. The acrylic acid is introduced in slight excess relative to the epoxide groups, such that the ratio of the concentrations of the functions is: [acid]/[epoxy]=1.05. At the end of the chemical modification, the CPMs are isolated by drying under vacuum (20 mbar) at room temperature. The final conversion of the epoxide groups is 95%, which corresponds to a concentration of reactive acrylic double bonds [C=C]=9.1× 10–4 mol/g. The dried CPMs are in the form of a solid, which can be ground to a fine powder.

The size and mass of the CPMs are determined by a multiple-angle laser light scattering technique (reference: DAWN from WYATT TECHNOLOGY, operating at 632 nm), on exiting the steric exclusion chromatography columns. The molar mass and size of the CPMs are:

=5.8×10$^5$ g/mol and $\overline{R_Z}$=31 nm

The temperature of the onset of the glass transition zone, $T_g^{onset}$, for these CPMs, measured by differential calorimetric analysis, is 62° C.

Example 2

A reference photo-crosslinkable formulation (F1) consisting, on the basis of 100 parts (by weight), of:

47.5 parts of isobornyl acrylate (SR 506, CRAY VALLEY)

47.5 parts of an acrylated oliomer, reference PRO 971 from SARTOMER 3 parts of Darocur 1173 (CIBA GEIGY)

2 parts of Irgacure 184 (CIBA GEIGY)

was prepared at room temperature. The acrylated oligomer PRO 971 is a copolymer obtained via a radical-mediated route, corresponding to the product sold in dilution, reference CN 818, by the company SARTOMER and composed of:

butyl acrylate methyl methacrylate glycidyl methacrylate.

The glycidyl function of the oligomer is modified in the second step by reaction with acrylic acid to give the acrylated oligomer.

In order to evaluate the provision of CPM regarding the compromise in terms of hardness/flexibility/adhesive of the final film, the photo-crosslinkable formulation below (F2) was prepared: on the basis of 100 parts:

47.5 parts of isobornyl acrylate (SR 506, CRAY VALLEY)

19 parts of acrylated CPM of Example 1

28.5 parts of PRO 971 (SARTOMER)

3 parts of Darocur 1173 (CIBA GEIGY)

2 parts of Irgacure 184 (CIBA GEIGY)

The two formulations have a very similar viscosity at 20° C. The results in Table I show that formulation F2 has a shear thinning nature.

The properties of the corresponding films are summarized in Table II. The thicknesses of the coatings for the hardness measurement are from about 80 to 100 μm.

TABLE I

Values of the viscosities of the formulations at 50 and 250 s$^{-1}$, measured at 20° C.

| Formulation | Shear rate (s$^{-1}$) | Viscosity (Pa.s) |
|---|---|---|
| F1 | 50 | 2 |
|  | 250 | 2 |
| F2 | 50 | 1.77 |
|  | 250 | 1.64 |

TABLE II

Summary of the physical properties of the films obtained using F1 and F2

|  | Hardness (N/mm$^2$) | "T-bend" flexibility | Resistance to cross-cutting on glass (adhesion) | Chemical resistance (s) |
|---|---|---|---|---|
| F1 | 42 | 1.5 T | 5 | 80 ± 10 |
| F2 | 76 | 1.5 T | 1 | 80 ± 10 |

Example 3

The CPMs of Example 1 are introduced into a mixture of acrylic monomers (mixture A) below:

isobornyl acrylate (SR 506): 60% by mass isodecyl acrylate (SR 395, from CRAY VALLEY): 38% by mass hexanediol diacrylate (SR 238): 2% by mass Photo-crosslinkable formulations based on the mixture A and containing different concentrations by mass of CMP are prepared. The compositions are summarized in Table III.

TABLE III

Compositions of the various formulations used in Example 3 (on the basis of 100 parts)

| Formulations | Mixture A | CPM | Darocur 1173 | Irgacure 184 |
|---|---|---|---|---|
| F3 (ref) | 95 | 0 | 3 | 2 |
| F4 | 90.25 | 4.75 | 3 | 2 |
| F5 | 87.9 | 7.1 | 3 | 2 |
| F6 | 85.5 | 9.5 | 3 | 2 |
| F7 | 80.75 | 14.25 | 3 | 2 |
| F8 | 76 | 19 | 3 | 2 |
| F9 | 66.5 | 28.5 | 3 | 2 |
| F10 | 57 | 38 | 3 | 2 |

TABLE IV

Viscosity of the formulations at 20° C.

| Formulations | Shear rate (s$^{-1}$) | Viscosity (Pa.s) |
|---|---|---|
| F6 | 50 | 0.04 |
|  | 250 | 0.03 |
| F8 | 50 | 0.18 |
|  | 250 | 0.14 |
| F9 | 50 | 0.65 |
|  | 250 | 0.50 |
| F10 | 50 | 2.78 |
|  | 250 | 2.16 |

The physicochemical properties (hardness, flexibility, chemical resistance) of the various coatings are given in the recapitulative Table V. The thicknesses of the films for the hardness measurement are from 20 to 25 μm.

TABLE V

Physicochemical properties of the coatings

| Formulations | Hardness (N/mm$^2$) | "T-bend" flexibility | Chemical resistance (s) |
|---|---|---|---|
| F3 | (a) | 0 T | 20 ± 10 |
| F8 | ≈5 | 1 T | 55 ± 10 |
| F9 | 52 | 1 T | 65 ± 10 |
| F10 | 80 | 1.5 T | 60 ± 10 |

(a): not measurable (value too low)

Table VI shows the results of the abrasion tests, compared with the values obtained with a coating taken as a comparative example having good abrasion strength. The abrasion properties are measured on 80 to 100 μm films.

TABLE VI

Abrasion properties of the coatings

| Formulations | Abrasion strength (mg) | Reminder of the hardness values (N/mm$^2$) |
|---|---|---|
| F3 | 16.3 | —(a) |
| F9 | 36 | 52 |
| F10 | 40.8 | 80 |
| Reference(b) | 30 | 14 |

(a): not measurable (value too low)
(b): composition, per 100 p, of the formulation
20 p CN976 (from CRAY VALLEY)
52 p CN550 (from CRAY VALLEY)
23 p CN501 (from CRAY VALLEY)
3 p Darocur 1173
2 p Irgacure 184

Table VII shows the adhesion measurements on different substrates.

TABLE VII

Adhesion properties of the coatings

| Formulations | Aluminium | Glass | Polycarbonate (PC) | Polyethylene (PE) | Polypropylene (PP) | Corona-treated PE | Corona-treated PP |
|---|---|---|---|---|---|---|---|
| F3 | 0 | 0 | 0 | 5 | 5 | 5 | 5 |
| F4 | 0 | 0 | 0 | 5 | 5 | 5 | 5 |
| F5 | 0 | 0 | 0 | 5 | 0 | 0 | 0 |

TABLE VII-continued

Adhesion properties of the coatings

| Formulations | Aluminium | Glass | Polycarbonate (PC) | Polyethylene (PE) | Polypropylene (PP) | Corona-treated PE | Corona-treated PP |
|---|---|---|---|---|---|---|---|
| F6 | 0 | 0 | 0 | 0 | 0 | 0 | 0 |
| F7 | 0 | 0 | 0 | 0 | 0 | 0 | 0 |
| F8 | 0 | 0 | 0 | 5 | 0 | 0 | 0 |
| F9 | 0 | 0 | 5 | 5 | 5 | 0 | 0 |
| F10 | 0 | 0 | 5 | 5 | 5 | 5 | 5 |

These examples illustrate perfectly a simultaneous increase in the adhesion and hardness properties in the case of coatings containing CPMs of the invention.

Example 4

The formulation prepared contains:
46.55 parts (by weight) of isobornyl acrylate (SR 506)
19.95 parts of 2-(2-ethoxyethoxy)ethyl acrylate (SR 256 from CRAY VALLEY)
28.5 parts of CPM of Example 1
3 parts of Darocur 1173
2 parts of Irgacure 184

The mechanical properties measured at 23° C. on the free film are:
Young's modulus =130 MPa
Elongation at break =70%
Breaking stress =12.5 MPa These results illustrate for this coating a good compromise in terms of hardness/flexibility with good adhesion of the coating to glass and aluminium. The reference film without CPM is extremely brittle, with virtually no elongation at break, thus not allowing it to be characterized according to the methods described above.

What is claimed is:

1. Crosslinked microparticles of between 10 and 300 nm in size, obtained by polymerization of a composition of ethylenically unsaturated polymerizable compounds, the composition of polymerizable compounds comprising:
   a first component A representing from 50 to 99 mol % of the composition and selected from the group consisting of isobornyl (meth)acrylate, norbornyl (meth)acrylate, cyclohexyl (meth)acrylate, and combinations thereof, optionally in combination with a $C_2$–$C_3$ alkyl (meth)acrylate
   a second component B consisting of at least one monomer or oligomer comprising at least two ethylenic unsaturations which can undergo radical-mediated polymerization, the monomer or oligomer being other than an allylic(meth)acrylate
   a third component C consisting of at least one monomer or oligomer comprising, in addition to an ethylenic unsaturation which can undergo radical-mediated polymerization, at least one reactive function f1 which is different from the ethylenic unsaturation
   optionally with at least partial chemical modification of the initial functions f1 into final functions f2 under the condition that the functions f1 selected do not react with each other during the polymerization, with the sum of the components A, B and C being 100 mol %.

2. The microparticles of claim 1, wherein functions f1 borne by the component C are selected from the group consisting of: epoxy, hydroxyl, carboxyl, carboxylic anhydride, isocyanate, silane, amine, oxazoline, and, where appropriate, functions f1 at least partially modified into functions f2, selected from: (meth)acrylates, vinyls, maleates, maleimides, itaconates, allylic alcohol esters, unsaturations based on dicyclopentadiene, $C_{12}$–$C_{22}$ unsaturated fatty esters or amides, carboxylic acid salts and quaternary ammonium salts.

3. The microparticles of claim 1 wherein component C is present in a molar content of between 0 and 49.5 mol % relative to the sum of the polymerizable compounds, and is selected from the group consisting of: glycidyl (meth)acrylate, $C_2$–$C_6$ hydroxyalkyl (meth)acrylates, (meth)acrylic acid, maleic acid or anhydride or fumaric acid, itaconic acid or anhydride, isocyanatoethyl (meth)acrylate, dimethylaminoethyl (meth)acrylate, and 2-(5-methacryloylpentyl)-1,3-oxazoline.

4. The microparticles of claim 1 wherein component B is selected from multifunctional (meth)acrylate monomers of functionality ranging from 2 to 6, substituted or unsubstituted divinylbenzenes and/or multifunctional (meth)acrylic ester oligomers or unsaturated polyesters of functionality ranging from 2 to 50 and with a number average molecular weight Mn of less than 2500.

5. The microparticles of claim 1 wherein the composition of the polymerizable compounds comprises:
   50 to 95 mol % of a component A selected from the group consisting of isobornyl (meth)acrylate, norbornyl (meth)acrylate, and combinations thereof optionally in combination with butyl, (meth)acrylate,
   0.5 to 10 mol % of a component B consisting of at least one monomer and/or oligomer selected from:
      di(meth)acrylates of: ethylene glycol, propylene glycol, butanediol, 2-methylpropanediol, neopentyl glycol, hexanediol, diol oligomers with an Mn of less than 2500,
      substituted or unsubstituted divinylbenzenes
      unsaturated polyester oligomers or acrylated acrylic oligomers with an Mn of less than 2500
      and having a number of ethylenic unsaturations per mole of from 2 to 50
   not more than 49.5 mol % of a component C consisting of at least one monomer and/or oligomer selected from:
      (meth)acrylic acid, maleic, fumaric or itaconic acid, when f1 is a carboxyl function;
      maleic anhydride or itaconic anhydride when, f1 is a carboxylic anhydride function;
      hydroxyalkyl (meth)acrylates containing a $C_2$–$C_6$ alkyl or mono (meth) acrylates of polyether or polyester or polyurethanediol or polycaprolactone oligomers with an Mn of less than 1500, when f1 is a hydroxyl function;
      glycidyl (meth)acrylate, (meth)acrylates of epoxidized derivatives of dicyclopentadiene or epoxidized vinylnorbornene (meth)acrylates or alkoxylated glycidyl ether (meth)acrylates or (meth)acrylates of epoxidized derivatives of cyclohexene, when f1 is an epoxy function;
      isocyanatoethyl (meth)acrylate and urethane mono (meth) acrylates derived from diisocyanates, when f1 is an isocyanate function;
      (meth)acrylates bearing a trialkyl or trialkoxysilane group, when f1 is a silane function;
      dimethylaminoethyl (meth)acrylate or tert-butylaminoethyl (meth)acrylate, when f1 is an amine function;
      2-(5-(meth)acryloylpentyl)-1, 3-oxazolin, when f1 is a oxazoline function; with the sum A+B+C being equal to 100 mol %.

6. The microparticles according to claim 1 wherein f1 is carboxyl functions or hydroxyl functions which are partially or totally modified into functions f2 selected from the group consisting of: (meth)acrylate, vinyl maleate, fumarate, maleimide, carboxylic acid salt and combinations thereof.

7. The microparticles of claim 1 wherein they bear hydroxyl or epoxy functions f1 optionally partially modified into (meth)acrylate functions f2.

8. A process for preparing the microparticles as defined in claim 1, the process comprising the steps of:
polymerizing, via radial-mediated dispersion polymerization, in a non-aqueous medium which is a nonsolvent for the polymer formed, a composition of polymerizable compounds as defined in claim 1, without any addition of a stabilizing polymer for the microparticles formed, either before, during or after polymerization and optionally,
chemically modifying, at least partially, the functions f1 borne by the component C.

9. A coating, moulding or composite composition, comprising the microparticles of claim 1.

10. The composition of claim 9 consisting essentially of the microparticles of claim 1 comprising functions f1 and/or f2 which are identical or different and which can be crosslinked between microparticles, forming at least one crosslinking network.

11. The composition of claim 9 comprising from 0.5 to 50% by weight of the microparticles of claim 1.

12. The composition of claim 9 wherein the composition is a coat composition.

13. The composition according to claim 12 wherein the coating composition is a composition which can undergo radical-mediated crosslinking, comprising: (i) acrylic or vinyl mono-or multifuctional monomers and/or multifunctional acrylic oligomers and (ii) the microparticles of claim 1 bearing f2 functions selected from the group consisting of (meth)acrylate, maleate, fumarate, maleimide functions and combinations thereof, the f2 functions obtained from the at least partial modification of the starting functions f1.

14. The composition of claim 12 wherein the coating composition is a composition which can undergo crosslinking by radiation.

15. The composition of claim 13 wherein the crosslinkable composition comprises: (i) acrylic monomers selected from the group consisting of isobornyl (meth)acrylate, isodecyl (meth)acrylate, lauryl (meth)acrylate, 2-(2-ethoxyethoxy) ethyl (meth)acrylate, tridecyl (meth)acrylate, 2-phenoxyethyl (meth)acrylate, tetrahydrofurfuryl (meth)acrylate and combinations thereof, and/or (ii) at least one acrylic oligomer chosen from the group consisting of: polyether (meth)acrylates, polyester (meth)acrylates, polyurethane (meth)acrylates, polycaprolactone (meth)acrylates, epoxy (meth)acrylates and (meth) acrylated acrylic copolymers.

16. The coating composition of claim 12, characterized in that it is intended to be applied or is applied in the form of a coating on polar or nonpolar substrates and comprises:
0.5 to 50% of the microparticles of claim 1, having f2 functions selected from the group consisting of (meth)acrylate, maleate, fumarate, maleimide and combinations thereof,
50 to 99.5% by weight of at least one monomer chosen from: isobornyl (meth)acrylate, isodecyl (meth)acrylate; lauryl (meth)acrylate; or tridecyl (meth)acrylate,
0 to 5% by weight of a $C_1$–$C_6$ alkylenediol di(meth)acrylate the percentages being chosen such that the total sum of the microparticles and monomers is equal to 100% by weight.

17. The coating composition according to claim 16 wherein:
the polar substrates are selected from the group consisting of: glass, steel, aluminum, silicon, polycarbonate, wood, glass fibres, carbon fibres, cellulose fibres, polyester and polyamide fibres;
the non-polar substrates are selected from the group consisting of: polyolefins, polypropylene and ethylene/propylene copolymers with or without special surface treatment, and coatings of low surface tension.

18. The coating composition of claim 16 applied to the substrate in the form of a thin film with a thickness of less than 100 microns.

19. The composition of claim 12, wherein the coating composition is a composition of an aqueous dispersion of a crosslinkable polymer, comprising reactive water-dispersible or water-soluble microparticles, which participate in the crosslinking.

20. The coating composition of claim 9, wherein the composition is a composition comprising epoxidized derivatives.

21. The coating composition of claim 20, wherein the composition is crosslinkable by UV radiation in the presence of a cationic photo-initiator and comprises microparticles bearing epoxy and/or hydroxyl functions f1.

22. The coating composition of claim 20, wherein the composition is crosslinkable by condensation reaction with at least one second reactive component selected from the group consisting of: polyamines, carboxy functionalized or carboxylic anhydride-functionalized polymers or copolymers; and combinations thereof.

23. The coating composition of claim 20, when the composition can be crosslinked by condensation reaction, the composition comprising microparticles having functions f1 and/or f2 selected from the group consisting of: epoxy; hydroxyl; carboxyl; anhydride; and combinations thereof.

24. The coating composition of claim 9, wherein the composition comprises: (i) at least one reactive resin selected from the group consisting of: alkyds, unsaturated polyesters, saturated polyesters, polyamides, polyurethanes and polyureas and (ii) the microparticles of claim 1.

25. The moulding composition of claim 9 further comprising: (i) at least one reactive resin selected from the group consisting of: unsaturated polyesters, dicyclopentadiene resins, vinyl ester resins, epoxides, polyamines, polyurethanes, polyureas and polyurethane-ureas; and (ii) the microparticles of claim 1.

26. The moulding composition according to claim 25, further comprising inorganic and/or organic fillers and/or reinforcing agents chosen from the group consisting of: glass fibres, glass mats, carbon fibres, cellulose fibres, polyester and polyamide fibres.

27. The coating composition of claim 24 wherein the microparticles further comprise functions f1 and/or f2 that are reactive with at least one function borne by this or these reactive resin(s).

28. The moulding composition of claim 25 wherein the microparticles further comprise functions f1 and/or f2 that arm reactive with at least one function borne by this or these reactive resin (s).

29. The microparticles of claim 5, wherein the diol oligomer are polyethers, polyesters, or polyurethanes.

30. The coating composition of claim 16 wherein the microparticles comprise from 5 to 30% by weight of the total sum of microparticles and monomers.

31. The coating composition of claim 17 wherein the polyolefin is polyethylene.

* * * * *